US008651252B2

(12) United States Patent
Katayama et al.

(10) Patent No.: US 8,651,252 B2
(45) Date of Patent: Feb. 18, 2014

(54) SHOCK ABSORBER

(75) Inventors: Yohei Katayama, Yokohama (JP);
Takao Nakadate, Yamato (JP); Kenji Noda, Yamato (JP); Mikio Yamashita, Yokohama (JP); Fumiyuki Yamaoka, Sagamihara (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 5 days.

(21) Appl. No.: 13/338,731

(22) Filed: Dec. 28, 2011

(65) Prior Publication Data
US 2012/0160624 A1 Jun. 28, 2012

(30) Foreign Application Priority Data

Dec. 28, 2010 (JP) ................................. 2010-292258
Nov. 1, 2011 (JP) ................................. 2011-240307

(51) Int. Cl.
*F16F 9/34* (2006.01)
(52) U.S. Cl.
USPC .................................. 188/282.6; 188/322.15
(58) Field of Classification Search
USPC .......... 188/266.2, 266.3, 266.5, 282.1–282.9, 188/283–288, 316, 317, 322.15, 322.22
See application file for complete search history.

(56) References Cited

U.S. PATENT DOCUMENTS

| 5,248,014 | A * | 9/1993 | Ashiba ........................ 188/282.8 |
| 6,220,409 | B1 * | 4/2001 | Deferme .................. 188/322.15 |
| 7,100,750 | B2 * | 9/2006 | Drees ........................ 188/322.15 |
| 7,458,448 | B2 * | 12/2008 | Katou et al. ................ 188/282.6 |
| 7,757,826 | B2 * | 7/2010 | Hayama et al. ............. 188/282.2 |
| 7,954,609 | B2 * | 6/2011 | Chikamatsu et al. .......... 188/280 |
| 2002/0000352 | A1 * | 1/2002 | Matsumoto et al. ........ 188/282.1 |
| 2003/0132073 | A1 * | 7/2003 | Nakadate .................... 188/282.2 |
| 2004/0149530 | A1 * | 8/2004 | Drees ........................ 188/322.15 |
| 2008/0257668 | A1 * | 10/2008 | Yamaguchi et al. .......... 188/285 |
| 2009/0272611 | A1 * | 11/2009 | Hayama et al. ............. 188/282.1 |
| 2012/0160620 | A1 * | 6/2012 | Yamashita et al. .......... 188/266.5 |

FOREIGN PATENT DOCUMENTS

| JP | 6-94065 | 4/1994 |
| JP | 7-19642 | 4/1995 |

* cited by examiner

*Primary Examiner* — Christopher Schwartz
(74) *Attorney, Agent, or Firm* — Wenderoth, Lind & Ponack, LLP

(57) ABSTRACT

A frequency-dependent mechanism provided at the lower end of a piston rod includes a tubular housing displaceable in an inner tube, together with the piston rod as one unit, and further includes a free piston and O-rings. A shutter of a passage area varying mechanism is provided with an axially extending inner hole, orifices, and oil grooves. The opening area between oil holes 3C and the orifices 33B is changed according to the rotational position of the shutter. The opening area between oil holes 3D and 3E and the oil grooves 33C and 33D and the opening area between oil holes 3F and 3G and the oil grooves 33E and 33F are also variably adjusted according to the rotational position of the shutter.

9 Claims, 9 Drawing Sheets

SHOCK ABSORBER

BACKGROUND OF THE INVENTION

The present invention relates to shock absorbers suitably used to damp vibrations of automobiles, for example.

In vehicles such as two- or four-wheeled automobiles, a hydraulic shock absorber is generally provided between a wheel-side member and a vehicle body-side member to damp vertical vibrations, etc. generated during running of the vehicle. This hydraulic shock absorber uses an actuator to change the orifice area through which a hydraulic fluid passes, thereby enabling damping force generated to be properly adjusted over a range of from low damping force to high damping force. Moreover, the hydraulic shock absorber is additionally provided with a frequency-dependent mechanism (i.e. a mechanism whereby damping force reduces according to the input vibration frequency). The combination of the frequency-dependent mechanism and the damping force control mechanism allows an improvement in the vehicle ride quality (for example, see Japanese Patent Application Publication No. Hei 06-94065).

The frequency-dependent mechanism makes it possible to provide reduced damping force for high-frequency vibration input even when damping force characteristics are set to "hard" as shown, for example, in FIG. 2 of Japanese Patent Application Publication No. Hei 06-94065.

SUMMARY OF THE INVENTION

The above-described shock absorber according to the related art has a fixed orifice area to determine a variable width of damping force generated by the frequency-dependent mechanism. Therefore, when damping force to be generated by the damping force control type hydraulic shock absorber is changed to "hard", "medium" or "soft" damping force characteristics, the damping force variable width of the frequency-dependent mechanism cannot be changed freely according to each of the damping force characteristics ("hard", "medium" or "soft") selected.

For example, in a state where "hard" damping force characteristics are set to suppress roll when cornering, if the damping force variable width is increased to reduce high-frequency vibrations from the road surface, and then "soft" damping force characteristics are set to improve the vehicle ride quality during running on a good road, it is impossible to obtain such characteristics that reduce the damping force variable width in order to suppress vibrations at the unsprung resonance frequency.

The present invention has been made in view of the above-described problem with the related art. Accordingly, an object of the present invention is to provide a shock absorber configured to enable the damping force variable width of a frequency-dependent mechanism to be changed freely according to each selected damping force characteristics when switched from one to another.

To solve the above-described problem, the present invention provides a shock absorber including a cylinder having a hydraulic fluid sealed therein. The shock absorber further includes a piston slidably fitted in the cylinder to define two chambers in the cylinder and a piston rod secured at one end thereof to the piston. The other end of the piston rod projects out of the cylinder. Further, the shock absorber includes a main passage through which the hydraulic fluid flows between the two chambers in the cylinder in response to movement of the piston, a first passage and a second passage, which are provided in parallel to the main passage, and through which the hydraulic fluid flows from either one of the two chambers in the cylinder toward the other chamber in response to movement of the piston, a main damping valve provided in the main passage to regulate a flow of the hydraulic fluid induced by movement of the piston to generate a damping force, a damping force generating mechanism provided in the first passage to regulate a flow of the hydraulic fluid induced by movement of the piston to generate a damping force, and a free piston provided in the second passage to divide the second passage into an upstream section and a downstream section. In addition, the shock absorber has a passage area varying mechanism provided at a middle point in both the first passage and the second passage. The passage area varying mechanism is capable of adjusting the passage area of each of the first and second passages.

According to the present invention, the area of the first passage and the area of the second passage can be adjusted separately from each other by the passage area varying mechanism. Therefore, no matter to which damping force characteristics, i.e. "hard", "medium" or "soft" characteristics, damping force to be generated by the shock absorber is changed, the damping force variable width of a frequency-dependent mechanism comprising the free piston can be freely changed according to each of the damping force characteristics selected.

DETAILED DESCRIPTION OF THE INVENTION

The following embodiments present not only the above-described technical problems and advantageous effects of the present invention but also various other solutions to problems and advantages. Principal problems that the following embodiments solve, including those stated above, will be listed below.

[Characteristics Improvement]

When damping force characteristics (damping force with respect to the piston speed) are changed from one to another in accordance with vibration conditions, it is demanded, for example, that the damping force characteristics should be changed as smoothly as possible. The reason for this is as follow. If switching abruptly occurs between damping force characteristics that generate small damping force and damping force characteristics that generate large damping force, damping forces actually generated also abruptly switch from one to another, which degrades the vehicle ride quality. If switching of damping forces occurs during the steering of the vehicle, the behavior of the vehicle becomes unstable, so that the driver may feel uneasy about the steering operation. Under these circumstances, studies have been made to allow damping force characteristics to be changed as smoothly as possible, as disclosed in the above-mentioned Japanese Patent Application Publication No. Hei 06-94065. In this regard, however, further characteristics improvement has been demanded.

[Suppression of Upsizing]

A frequency-dependent mechanism needs an area for a free piston to move up and down. Therefore, as the area for the free piston is increased, the axial length of the cylinder apparatus increases. As the cylinder apparatus increases in size, the degree of freedom with which the cylinder apparatus can be mounted to the vehicle body lowers. Therefore, the increase in axial length of the cylinder apparatus is a serious problem. lithe cylinder apparatus is equipped with a mechanism of controlling damping force externally, the apparatus unavoidably increases in size by an amount corresponding to the size of the mechanism. Therefore, downsizing of the frequency-dependent mechanism section is strongly demanded.

[Reduction of Parts Count]

The frequency-dependent mechanism requires constituent parts such as a housing and a free piston in addition to a piston. Therefore, the number of parts increases. An increased parts count has adverse effects on productivity, durability, reliability, and so forth. Accordingly, it is desired to reduce the parts count while attaining desired characteristics, i.e. damping force characteristics corresponding to a wide range of vibration frequencies.

Shock absorbers according to embodiments of the present invention will be explained below in detail with reference to the accompanying drawings by way of an example in which the present invention is applied to a hydraulic shock absorber for a vehicle.

Figure 12:
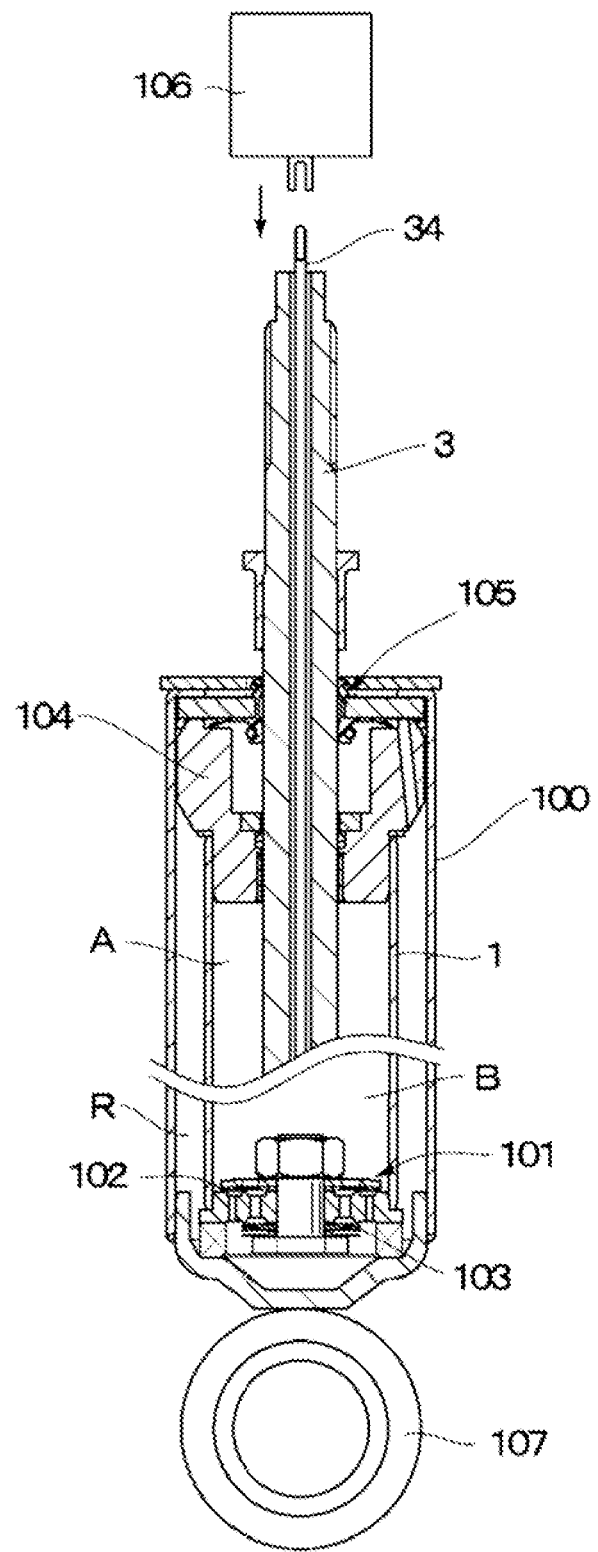
FIG. 12 is a vertical sectional view showing the entire structure of the hydraulic shock absorber according to the first and second embodiments.

FIGS. 1 to 9 and 12 show a first embodiment of the present invention. FIG. 12 shows the entire structure of the first embodiment. Referring to FIG. 12, an outer tube 100 is provided around the outer periphery of an inner tube 1 Between the inner tube 1 and the outer tube 100 is provided a reservoir chamber R having a hydraulic oil and a gas sealed therein. The reservoir chamber R and a bottom-side oil chamber B are connected through a bottom valve mechanism 101. The bottom valve mechanism 101 has a check valve 102 allowing the hydraulic oil to flow from the reservoir chamber R toward the bottom-side oil chamber B with substantially no resistance. The bottom valve mechanism 101 further has a damping valve 103 generating a relatively large damping force.

A piston rod 3 connected to a piston 2 (described later) extends through a rod guide 104 and a seal 105 and projects out of the outer tube 100. A control rod 34 (described later) projects from the projecting end of the piston rod 3. The distal end of the piston rod 3 is secured to an automobile through a mounting member (not shown). To the piston rod 3 as secured to the automobile, a direct acting type actuator 106 is attached from the engine room or trunk room of the automobile. Reference numeral 107 denotes an eye for mounting the hydraulic shock absorber to a wheel-side member.

Figure 1:
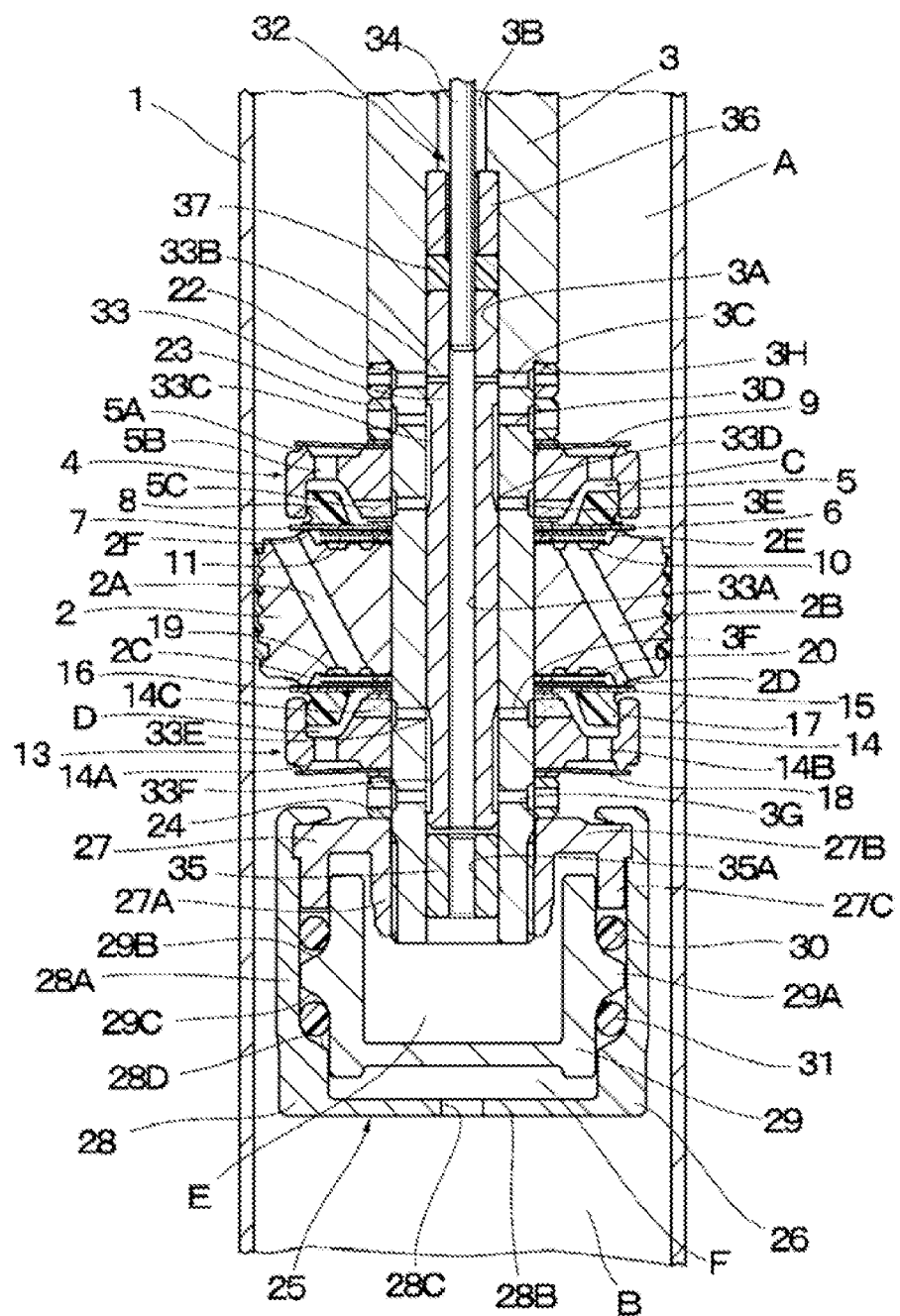
FIG. 1 is a vertical sectional view of a hydraulic shock absorber according to a first embodiment of the present invention.

In FIG. 1, the inner tube 1 has a hydraulic oil sealed therein as a hydraulic fluid. An annular reservoir chamber R is formed between the outer tube 100 and the inner tube 1.

Reference numeral 2 denotes a piston slidably fitted in the inner tube 1. The piston 2 divides the interior of the inner tube 1 into two chambers, i.e. a rod-side oil chamber A and a bottom-side oil chamber B. The piston 6 has a plurality of circumferentially spaced oil paths 2A and a plurality of circumferentially spaced oil paths 28, which allow communication between the rod-side oil chamber A and the bottom-side oil chamber B. The oil paths 2A and 2B are oil holes sloped obliquely to the axis of the piston 2. The oil paths 2A and 2B constitute a main passage through which the hydraulic oil flows between the rod-side oil chamber A and the bottom-side oil chamber B.

The piston 2 has a lower end surface defined as one end thereof. The lower end surface of the piston 2 is provided with an annular recess 2C surrounding the opening at one end of each oil path 2A and further provided with an annular valve seat 2D located radially outside the annular recess 2C. A main disk 16 (described later) selectively seats on and unseats from the annular valve seat 2D. The upper end surface, i.e. the other end, of the piston 2 is provided with an annular recess 2E surrounding the openings at the other ends of the oil paths 2B and further provided with an annular valve seat 2F located radially outside the annular recess 2E. A main disk 7 (described later) selectively seats on and unseats from the annular valve seat 2F.

Reference numeral 3 denotes a piston rod extending axially into the inner tube 1. The piston rod 3 has a lower end defined as one end thereof. The lower end of the piston rod 3 is inserted into the inner tube 1 and secured to the piston 2 by a capped nut 27 of a housing 26 (described later), etc. The upper end, as the other end, of the piston rod 3 projects out of the outer and inner tubes 100 and 1 through the rod guide 104 and so forth. The piston rod 3 is provided with a shutter fitting hole 3A and a reduced-diameter rod insertion hole 3B extending axially through the inner periphery thereof. The shutter fitting hole 3A opens at the lower end of the piston rod 3 and has a shutter 33 (described later) rotatably fitted therein. The rod insertion hole 3B extends upward from the upper end of the shutter fitting hole 3A.

The piston rod 3 is provided with axially spaced groups of a plurality of circumferentially spaced oil holes 3C, 3D, 3E, 3F and 3G extending radially outward from the shutter fitting hole 3A. Among the oil holes 3C to 3G, the oil holes 3C to 3E are disposed in the rod-side oil chamber A defined in the inner tube 1 by the piston 2, and the remaining oil holes 3F and 3G are disposed in the bottom-side oil chamber B in the inner tube 1.

Among the oil holes 3C to 3G, the uppermost oil holes 3C are selectively brought into and out of communication with an inner hole 33A of the shutter 33 (described later) through radial orifices 33B. The oil holes 3D and 3E are selectively brought into and out of communication with each other through oil grooves 33C and 33D of the shutter 33 (described later). The oil holes 3F and 3G are selectively brought into and out of communication with each other through oil grooves 33E and 33F of the shutter 33 (described later). Further, the piston rod 3 has an annular stepped portion 3H formed on the outer periphery thereof. A port member 22 (described later) is axially positioned to the stepped portion 3H.

Reference numeral 4 denotes a compression damping force generating mechanism (hereinafter referred to as "compression damping mechanism 4") used in this embodiment. The compression damping mechanism 4 is, as shown in FIG. 1, located in the rod-side oil chamber A of the inner tube 1 and secured to the upper side of the piston 2. When the piston 2 is slidingly displaced downward in the inner tube 1 during the compression stroke of the piston rod 3, the compression damping mechanism 4 offers resistance to the hydraulic oil flowing from the bottom-side oil chamber B toward the rod-side oil chamber A through the oil paths 2B of the piston 2, a pressure chamber C (described later), the oil holes 3E and 3D of the piston rod 3, oil grooves 33C and 33D of the shutter 33 (described later), etc., thereby generating a predetermined damping force.

The compression damping mechanism 4 includes an upper casing member 5 in the shape of a cylinder, an upper end of which is closed. The upper casing member 5 is secured to the outer periphery of the piston rod 3 between a port member 23 (described later) and the piston 2. The compression damping mechanism 4 further includes a main valve 6 having an elastic seal member 8 (described later) fitted to the lower end surface of the upper casing member 5 with an interference to form an annular pressure chamber C between the main valve 6 and the upper casing member 5. Further, the compression damping mechanism 4 includes an outer check valve 9, an inner check valve 10, and a disk valve 11, which will be described later.

The upper casing member 5 of the compression damping mechanism 4 is provided with an annular valve seat 5A formed on an upper end surface thereof. The outer disk valve 9 selectively seats on and unseats from the annular valve seat 5A. The upper casing member 5 is further provided with oil holes 5B located radially inside the annular valve seat 5A to serve as axial oil paths allowing the pressure chamber C to communicate with a region inside the annular valve seat 5A. Further, the upper casing member 5 is provided with oil grooves 5C serving as radial oil paths allowing the pressure chamber C to constantly communicate with the oil holes 3E of the piston rod 3. The outer check valve 9 constitutes a relief valve, which opens when the pressure in the pressure chamber C increases to a predetermined relief set pressure. On occasions other than the above, the outer check valve 9 seats on the annular valve seat 5A and is thus kept closed.

The main valve 6 comprises a main disk 7 selectively seating on and unseating from the annular valve seat 2F of the piston 2 and an annular elastic seal member 8 secured to the outer periphery of the upper side of the main disk 7 by vulcanization bonding, baking or other similar method. The elastic seal member 8 is formed in the shape of a thick-walled ring by using an elastic material such as rubber to liquid-tightly seal the pressure chamber C, which is inside the elastic seal member 8, with respect to the rod-side oil chamber A, which is outside the elastic seal member 8.

The main disk 7 of the main valve 6 is configured to serve also as a main damping valve, which is a constituent feature of the present invention. The main valve 6 operates as follows. When a pressure difference between the oil chambers A and B increases to a predetermined set value during the compression stroke of the piston rod 3, the main disk 7 unseats from the annular valve seat 2F to generate a predetermined compression damping force. When the main valve 6 (main disk 7) opens, the oil chambers A and B communicate with each other through the oil paths 2B of the piston 2. Thus, a main passage, which is a constituent feature of the present invention, is formed.

Figure 2:
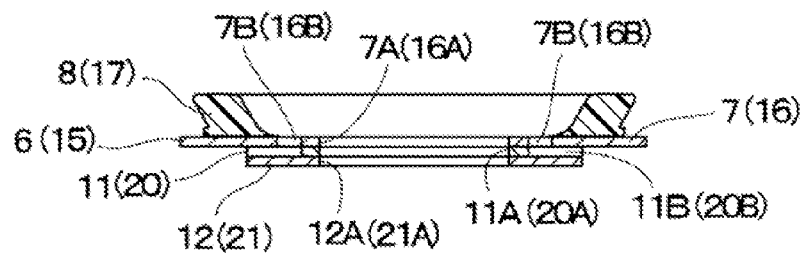
FIG. 2 is an enlarged vertical sectional view showing a main valve and a disk valve, which constitute a compression control valve in FIG. 1.
Figure 3:
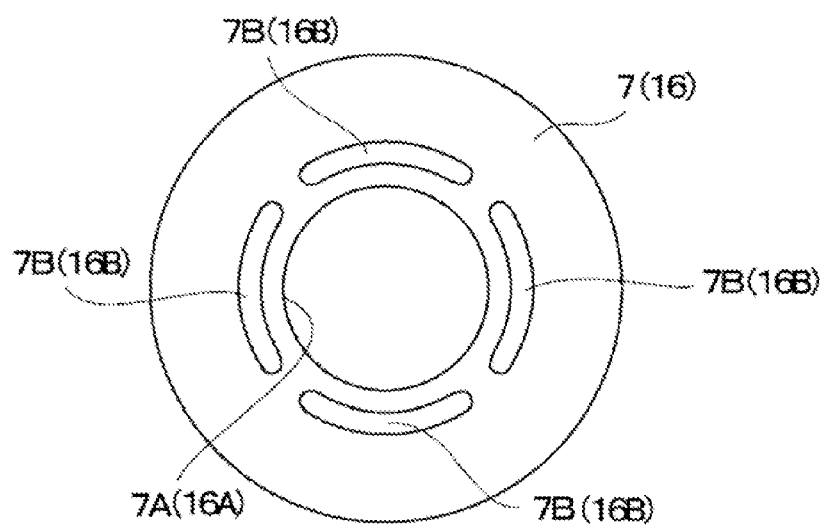
FIG. 3 is a bottom view showing the main valve in FIG. 2 as a single component.

The main disk 7 of the main valve 6 is, as shown in FIGS. 2 and 3, provided with a circular hole 7A and a plurality of circumferentially spaced arcuate holes 7B located radially outside the circular hole 7A. The main disk 7 is mounted on the outer periphery of the piston rod 3 through the circular hole 7A. The arcuate holes 7B constantly communicate between the annular recess 2E of the piston 2 and the pressure chamber C through cut portions 11B of the disk valve 11 (described later).

Reference numeral 10 denotes an inner check valve provided in the annular recess 2E of the piston 2. The inner check valve 10 selectively unseats from and seats on the bottom of the annular recess 2E to bring the oil paths 2B of the piston 2 into and out of communication with the annular recess 2E. The inner check valve 10 allows the hydraulic oil in the bottom-side oil chamber B to flow from the oil paths 2B of the piston 2 toward the annular recess 2E and blocks the reverse flow of hydraulic oil from the annular recess 2E toward the oil paths 2B.

Figure 4:
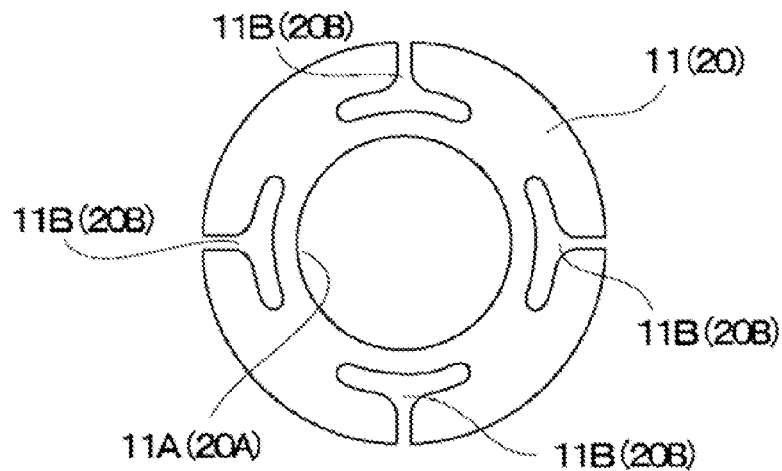
FIG. 4 is a bottom view showing the disk valve in FIG. 2 as a single component.

Reference numeral 11 denotes a disk valve provided over the inner check valve 10 with a spacer or the like interposed therebetween. The disk valve 11 is, as shown in FIGS. 2 and 4, provided with a circular hole 11A and a plurality of circumferentially spaced cut holes 11B located radially outside the circular hole 11A. The disk valve 11 is mounted on the outer periphery of the piston rod 3 through the circular hole 11A. Each cut hole 11B is formed as an oil hole of substantially T shape. The cut holes 11B constantly communicate between the annular recess 2E of the piston 2 and the pressure chamber C through the arcuate holes 7B of the main disk 7. In this case, the cut holes 11B have a sufficiently smaller passage area than the arcuate holes 7B of the main disk 7 to apply a restrictor action to the hydraulic oil flowing therethrough, thereby generating damping force.

Reference numeral 12 denotes a backup disk sandwiching the disk valve 11 between itself and the main disk 7. The backup disk 12 is mounted on the outer periphery of the piston rod 3 through a circular hole 12A. The backup disk 12 reinforces the disk valve 11 and the main disk 7 by abutting thereagainst from below at the upper end surface of the backup disk 12. The backup disk 12 is disposed in the annular recess 2E of the piston 2 to function also as a retainer that regulates the maximum degree of opening of the inner check valve 10.

Reference numeral 13 denotes an extension damping force generating mechanism (hereinafter referred to as "extension damping mechanism 13") used in this embodiment. The extension damping mechanism 13 is, as shown in FIG. 1, located in the bottom-side oil chamber B of the inner tube 1 and secured to the lower side of the piston 2. When the piston 2 is slidingly displaced upward in the inner tube I during the extension stroke of the piston rod 3, the extension damping mechanism 13 offers resistance to the hydraulic oil flowing from the rod-side oil chamber A toward the bottom-side oil chamber B through the oil paths 2A of the piston 2, a pressure chamber D in a lower casing member 14, the oil holes 3F and 3G of the piston rod 3, the oil grooves 33E and 33F of the shutter 33 (described later), etc., thereby generating a predetermined damping force.

The extension damping mechanism 13 includes a lower casing member 14 in the shape of a cylinder, a lower end of which is closed. The lower casing member 14 is secured to the outer periphery of the piston rod 3 between a port member 24 (described later) and the piston 2. The extension damping mechanism 13 further includes a main valve 15 having an elastic seal member 17 (described later) fitted to the upper end surface of the lower casing member 14 with an interference to form an annular pressure chamber D between the main valve 15 and the lower casing member 14. Further, the extension damping mechanism 13 includes an outer check valve 18, an inner check valve 19, and a disk valve 20, which will be described later.

The lower casing member 14 of the extension damping mechanism 13 has substantially the same structure as that of the upper casing member 5 of the compression damping mechanism 4. The lower casing member 14 has an annular valve seat 14A, oil holes 14B as axial oil paths, and oil grooves 14C as radial oil paths. The outer check valve 18 constitutes a relief valve, which opens when the pressure in the pressure chamber D increases to a predetermined relief set pressure. On occasions other than the above, the outer check valve 18 seats on the annular valve seat 14A and is thus kept closed.

The main valve 15 has substantially the same structure as that of the main valve 6 of the compression damping mechanism 4. That is, the main valve 15 comprises a main disk 16 selectively seating on and unseating from the annular valve seat 2D of the piston 2 and an annular elastic seal member 17 secured to the outer periphery of the lower side of the main disk 16. The main valve 15 is configured to serve also as a main damping valve, which is a constituent feature of the present invention.

The main valve 15 operates as follows. When a pressure difference between the oil chambers A and B increases to a predetermined set value during the extension stroke of the piston rod 3, the main disk 16 unseats from the annular valve seat 2D to generate a predetermined extension damping force. When the main valve 15 (main disk 16) opens, the oil chambers A and B communicate with each other through the oil paths 2A of the piston 2. Thus, a main passage, which is a constituent feature of the present invention, is formed. The main disk 16 of the main valve 15 is also provided with a circular hole 16A and a plurality of arcuate holes 16B, as shown in FIGS. 2 and 3.

Reference numeral 19 denotes an inner check valve provided in the annular recess 2C of the piston 2. The inner check valve 19 selectively unseats from and seats on the bottom of the annular recess 2C to bring the oil paths 2A of the piston 2 into and out of communication with the annular recess 2C. The inner check valve 19 allows the hydraulic oil in the rod-side oil chamber A to flow from the oil paths 2A of the piston 2 toward the annular recess 2C and blocks the reverse flow of hydraulic oil from the annular recess 2C toward the oil paths 2A.

Reference numeral 20 denotes a disk valve provided underneath the inner check valve 19 with a spacer or the like interposed therebetween. The disk valve 20 has the same structure as that of the disk valve 11 of the compression damping mechanism 4. That is, the disk valve 20 has, as shown in FIGS. 2 and 4, a circular hole 20A and a plurality of cut holes 20B. The cut holes 20B of the disk valve 20 constantly communicate between the annular recess 2C of the piston 2 and the pressure chamber D through the arcuate holes 16A of the main disk 16. In this case, the cut holes 20B have a sufficiently smaller passage area than the arcuate holes 16B of the main disk 16 to apply a restrictor action to the hydraulic oil flowing therethrough.

Reference numeral 21 denotes a backup disk sandwiching the disk valve 20 between itself and the main disk 16. The backup disk 21 is mounted on the outer periphery of the piston rod 3 through a circular hole 21A. The backup disk 21 reinforces the disk valve 20 and the main disk 16 by abutting thereagainst from above at the lower end surface of the backup disk 21. The backup disk 12 is disposed in the annular recess 2C of the piston 2 to function also as a retainer that regulates the maximum degree of opening of the inner check valve 19.

Reference numerals 22 and 22 denote port members provided between the stepped portion 3H of the piston rod 3 and the upper casing member 5. The port members 22 and 23 are annular rings or the like fitted around the outer periphery of the piston rod 3. The port member 22 allows the hydraulic oil to flow in and out between the rod-side oil chamber A and the oil holes 3C of the piston rod 3. The port member 23 allows the hydraulic oil to flow in and out between the rod-side oil chamber A and the oil holes 3D of the piston rod 3.

Reference numeral 24 denotes another port member provided between the lower casing member 14 of the extension damping mechanism 13 and the capped nut 27. The port member 24 is also an annular ring or the like fitted around the outer periphery of the piston rod 3. The port member 24 allows the hydraulic oil to flow in and out between the bottom-side oil chamber B and the oil holes 3G of the piston rod 3.

Reference numeral 25 denotes a frequency-dependent mechanism provided at the lower end of the piston rod 3. The frequency-dependent mechanism 25 includes, as shown in FIG. 1, a tubular housing 26 displaceable in the inner tube 1, together with the piston rod 3 as one unit, and a free piston 29 (described later) provided displaceably in and relative to the housing 26. The frequency-dependent mechanism 25 further includes O-rings 30 and 31. The housing 26 comprises a capped nut 27 serving as a cap member screwed onto the lower end of the piston rod 3, and a bottomed tubular member 28.

The capped nut 27 comprises an inner nut portion 27A screwed onto the outer periphery of the lower end of the piston rod 3, an annular cap portion 27B extending radially outward from the upper end of the inner nut portion 27A, and an outer tubular downward extending portion 27C extending downward from the outer periphery of the annular cap portion 27B and having an inner peripheral surface serving as a guide surface for the free piston 29. The lower end surface of the tubular downward extending portion 27C constitutes a housing contact surface that an O-ring 30 (described later) contacts.

The bottomed tubular member 28 comprises a tubular portion 28A having an upper end secured to the annular cap portion 27B of the capped nut 27 from the outer side by caulking or other similar method. The tubular portion 28A extends downward in the inner tube 1. The bottomed tubular member 28 further comprises an annular bottom portion 28B closing the lower end of the tubular portion 28A. The bottom portion 28B has a communicating hole 28C formed in the center thereof. The communicating hole 28C communicates between a lower chamber F (described later) and the bottom-side oil chamber B.

The tubular portion 28A has a sloped arcuate surface 28D formed on the inner periphery thereof. The sloped arcuate surface 28D serves as a housing contact surface that an O-ring 31 (described later) contacts. The sloped arcuate surface 28D is inclined to the moving direction (i.e. axial direction) of a free piston 29 (described later) and has a curved surface. The sloped arcuate surface 28D deforms the O-ring 31 elastically and compressively between itself and an annular projection 29A (described later) when the free piston 29 is displaced downwardly. Thus, the sloped arcuate surface 28D has the function of suppressing the displacement of the free piston 29 toward the stroke end thereof by resistance offered by the O-ring 31.

Reference numeral 29 denotes a free piston slidably provided in the housing 26. As shown in FIG. 1, the free piston 29 is formed as a tubular piston, a lower end of which is closed. The free piston 29 has an annular projection 29A projecting radially outward from an axially intermediate position on the outer periphery thereof. The free piston 29 has a lower end, which is one axial end, displaceably fitted in the tubular portion 28A of the bottomed tubular member 28. The upper end of the free piston 29, which is the other axial end, is displaceably fitted in the tubular downward extending portion 27C of the capped nut 27.

The free piston 29, which is axially displaceable in and relative to the housing 26, is abuttable against the annular cap portion 27B of the capped nut 27 and the bottom portion 28B of the bottomed tubular member 28. The upper and lower stroke ends of the free piston 29 are defined by abutment of the free piston 29 against the annular cap portion 27B and the bottom portion 28B, respectively. The free piston 29 divides the interior of the housing 26 (i.e. the second passage) into two chambers, i.e. an upper chamber E, which is an upstream chamber, and a lower chamber F, which is a downstream chamber. The second passage is defined by the free piston 29, and no displacement flow of hydraulic oil occurs between the rod-side oil chamber A and the bottom-side oil chamber B. However, while the free piston 29 is moving relative to the housing 26, the hydraulic oil in the rod-side oil chamber A flows into the upper chamber E, and the same amount of hydraulic oil is pushed out from the lower chamber F toward the bottom-side oil chamber B. Therefore, there occurs, practically, a flow of hydraulic oil between the rod-side oil chamber A and the bottom-side oil chamber B.

The annular projection 29A, which is provided on the outer periphery of the free piston 29, has sloped arcuate surfaces 29B and 29C respectively formed by the tipper and lower surfaces thereof. The sloped arcuate surfaces 29B and 29C are free piston contact surfaces that O-rings 30 and 31 (described later) contact, respectively. The sloped arcuate surfaces 29B and 29C respectively constitute surfaces having curved surfaces inclined to the axial direction of the free piston 29. The sloped arcuate surface 29B of the free piston 29 axially faces the lower end surface of the tubular downward extending portion 27C across the O-ring 30. The sloped arcuate surface 29C axially faces the sloped arcuate surface 28D of the bottomed tubular member 28 across the O-ring 31.

The O-rings 30 and 31 are elastic members constituting resistive elements, respectively, of the frequency-dependent mechanism 25. The O-rings 30 and 31 are disposed between the tubular portion 28A of the housing 26 and the outer peripheral surface of the free piston 29 to liquid-tightly seal therebetween. The upper and lower chambers E and F in the housing 26 are kept sealed off from each other by the O-rings 30 and 31.

When the free piston 29 is displaced upward in the housing 26, the O-ring 30 is elastically and compressively deformed between the lower end surface of the tubular downward extending portion 27C and the annular projection 29A (sloped arcuate surface 29B) of the free piston 29. At this time, the O-ring 30 generates resistance to the upward displacement of the free piston 29 toward the stroke end. When the free piston 29 is displaced downward in the housing 26, the O-ring 31 is elastically and compressively deformed between the sloped arcuate surface 28D of the tubular portion 28A and the annular projection 29A (sloped arcuate surface 29C) of the free piston 29. At this time, the O-ring 31 generates resistance to the downward displacement of the free piston 29 toward the stroke end.

Reference numeral 32 denotes a passage area varying mechanism 32 used in this embodiment. The passage area varying mechanism 32 includes a shutter 33 (described later), a control rod 34, and an actuator (not shown), e.g. a stepping motor. The actuator of the passage area varying mechanism 32 is provided at the projecting end of the piston rod 3, for example, to rotate the shutter 33 through the control rod 34.

The shutter 33 is provided in the shutter fitting hole 3A of the piston rod 3. The shutter 33 constitutes an opening area varying member of the passage area varying mechanism 32. The shutter 33 is provided at the lower end of the control rod 34 so as to rotate together with the control rod 34 as one unit and rotated, together with the control rod 34, in the shutter fitting hole 3A of the piston rod 3. The control rod 34 is provided in the rod insertion hole 3B of the piston rod 3. The upper end of the control rod 34 is connected to an output shaft (not shown) of the actuator.

The shutter 33 has an inner hole 33A extending axially through the inner periphery thereof. The lower end of the inner hole 33A constantly communicates with the upper chamber E in the housing 26. The shutter 33 further has orifices 33B as openings extending radially outward from the inner hole 33A, oil grooves 33C and 33D formed on the outer peripheral surface of the shutter 33, being spaced from the orifices 33B in the axial direction of the shutter 33, and other oil grooves 33E and 33F formed on the outer peripheral surface of the shutter 33, being axially spaced from the oil grooves 33C and 33D.

Figure 5:
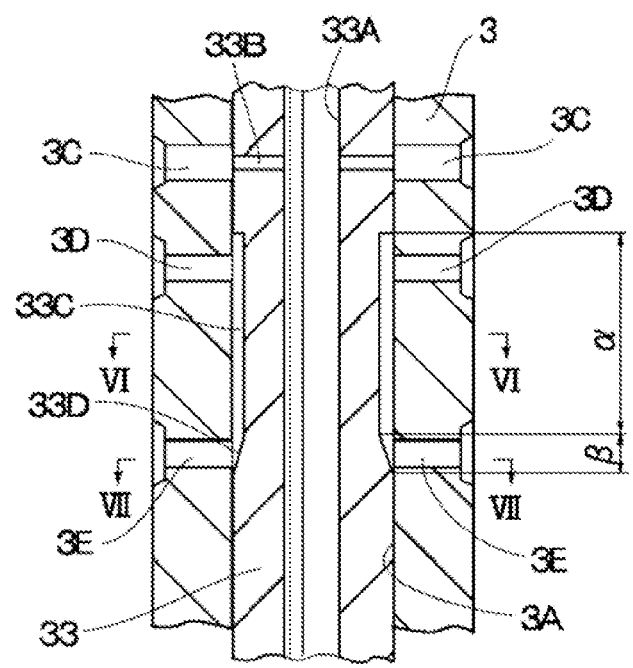
FIG. 5 is a fragmentary enlarged sectional view showing a piston rod and a shutter in FIG. 1.

The orifices 33B are, as shown in FIG. 5, disposed at respective positions where the orifices 33B can radially face the oil holes 3C of the piston rod 3. The orifices 33B selectively bring the oil holes 3C into and out of communication with the inner hole 33A according to the rotational position of the shutter 33. The second passage, which is a constituent feature of the present invention, comprises the port member 22, which communicates with the rod-side oil chamber A, the oil holes 3C of the piston rod 3, the orifices 33B and inner hole 33A of the shutter 33, and the housing 26. The second passage is parallel to the main passage. The interior of the housing 26, which constitutes a part of the second passage, is divided into an upper chamber E and a lower chamber F by the free piston 29.

Figure 6:
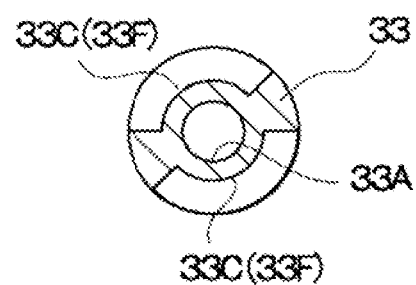
FIG. 6 is a horizontal sectional view of the shutter as seen from the direction of the arrow VI-VI in FIG. 5.
Figure 7:
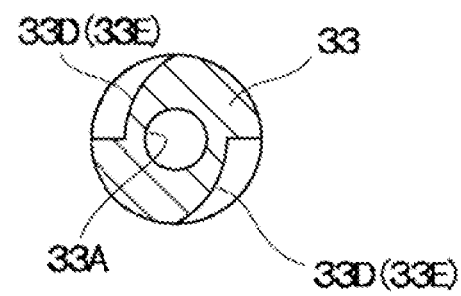
FIG. 7 is a horizontal sectional view of the shutter as seen from the direction of the arrow VII-VII in FIG. 5.

The oil grooves 33C and 33D of the shutter 33 selectively bring the oil holes 3D and 3E of the piston rod 3 into and out of communication with each other according to the rotational position of the shutter 33. As shown in FIG. 5, the oil grooves 33C extend over a distance α in the axial direction of the shutter 33, and the oil grooves 33D is formed over a shorter distance β (β<α). The oil grooves 33C are, as shown in FIG. 6, arcuate grooves formed on the outer peripheral surface of the shutter 33. The groove width of the oil grooves 33C is substantially uniform in the circumferential direction of the shutter 33. The oil grooves 33D are, as shown in FIG. 7, formed by arcuately cutting the outer peripheral surface of the shutter 33. The groove width of the oil grooves 33D gradually decreases in the circumferential direction of the shutter 33.

The oil grooves 33C and 33D of the shutter 33 constitute a compression first passage, which is a constituent feature of the present invention, together with the oil holes 3D and 3E of the piston rod 3, the pressure chamber C of the compression damping mechanism 4, the arcuate holes 7B of the main disk 7, the cut holes 11B (see FIGS. 2 to 4) of the disk valve 11, the oil paths 2B of the piston 2, etc. The first passage is parallel to the main passage.

The oil grooves 33E and 33F of the shutter 33 selectively bring the oil holes 3F and 3G of the piston rod 3 into and out of communication with each other according to the rotational position of the shutter 33. The oil grooves 33E are formed to extend over a distance β in the axial direction of the shutter 33, and the groove width of the oil grooves 33E gradually decreases in the circumferential direction of the shutter 33, as shown in FIG. 7, substantially in the same way as the above-described oil grooves 33D. The oil grooves 33F are formed to extend over a distance α in the axial direction of the shutter 33, and the groove width of the oil grooves 33F is substantially uniform in the circumferential direction of the shutter 33, as shown in FIG. 6, substantially in the same way as the above-described oil grooves 33C.

The oil grooves 33E and 33F of the shutter 33 constitute an extension first passage, which is a constituent feature of the present invention, together with the oil holes 3F and 3G of the piston rod 3, the pressure chamber D of the extension damping mechanism 13, the arcuate holes 16B of the main disk 16, the cut holes 20B (see FIGS. 2 to 4) of the disk valve 20, the oil paths 2A of the piston 2, etc. The first passage is parallel to the main passage.

In the shutter fitting hole 3A of the piston rod 3, a tubular member 35 is provided at the lower end (one axial end) of the shutter 33, and a tubular guide member 36 and a seal member 37 are provided at the upper end (the other axial end) of the shutter 33. The seal member 37 seals between the shutter fitting hole 3A and the control rod 34 to block leakage of the hydraulic oil to the outside. The tubular member 35 constitutes a fall-off preventing member to prevent the shutter 33 from falling off downward from the shutter fitting hole 3A. The tubular member 35 has an inner hole 35A extending through the inner periphery thereof. The inner hole 35A also constitutes a part of the above-described second passage.

The following is an explanation of the operation of the hydraulic shock absorber according to the first embodiment arranged as stated above.

To mount the hydraulic shock absorber onto a vehicle, the upper end of the piston rod 3 is secured to a vehicle body-side member, and the bottom of the outer tube is secured to a wheel-side member. During running of the vehicle, when vertical vibrations are caused by unevenness on the road surface, for example, the piston rod 3 is displaced to extend from and withdraw into the inner tube 1. Consequently, damping forces can be generated by the compression damping mechanism 4, the extension damping mechanism 13, and so forth. Thus, the vibrations of the vehicle can be damped.

More specifically, during the compression stroke of the piston rod 3, the piston rod 3 enters the inner tube 1. Consequently, the pressure in the bottom-side oil chamber B becomes higher than in the rod-side oil chamber A. Accordingly, the hydraulic oil in the bottom-side oil chamber B flows into the annular recess 2E from the oil paths 2B of the piston 2 through the inner check valve 10, and flows into the pressure chamber C of the compression damping mechanism 4 through the cut holes 11B of the disk valve 11 and the arcuate holes 7B (see FIGS. 2 to 4) of the main disk 7.

The hydraulic oil in the pressure chamber C flows into the rod-side oil chamber A from the oil grooves 5C of the upper casing member 5 through the oil holes 3E of the piston rod 3, the oil grooves 33D and 33C of the shutter 33, the oil holes 3D of the piston rod 3, and the port member 23. Thus, compression damping force can be generated, for example, by the cut holes 11B of the disk valve 11, the oil grooves 33D and 33C of the shutter 33, etc.

If, in this state, the contraction speed of the piston rod 3 increases and the pressure difference between the oil chambers A and B exceeds the above-mentioned set value, the main disk 7 of the main valve 6, which constitutes the main damping valve, unseats from the annular valve seat 2F to open.

Thus, a predetermined compression damping force can be generated. It should be noted that the outer check valve 9 of the compression damping mechanism 4 opens when the pressure in the pressure chamber C increases to the relief set pressure. Thus, the outer check valve 9 functions as a relief valve suppressing the increase in pressure in the pressure chamber C.

On the other hand, during the extension stroke of the piston rod 3, the pressure in the rod-side oil chamber A becomes higher than in the bottom-side oil chamber B. Accordingly, the hydraulic oil in the rod-side oil chamber A flows into the annular recess 2C from the oil paths 2A of the piston 2 through the check valve 19, and flows into the pressure chamber D of the extension damping mechanism 13 through the cut holes 20B of the disk valve 20 and the arcuate holes 16B of the main disk 16.

The hydraulic oil in the pressure chamber D flows into the bottom-side oil chamber B from the oil grooves 14C of the lower casing member 14 through the oil holes 3F of the piston rod 3, the oil grooves 33E and 33F of the shutter 33, the oil holes 3G of the piston rod 3, and the port member 24. Thus, extension damping force can be generated, for example, by the cut holes 20B of the disk valve 20, the oil grooves 33E and 33F of the shutter 33, etc.

If, in this state, the extension speed of the piston rod 3 increases and the pressure difference between the oil chambers A and B exceeds the above-mentioned set value, the main disk 16 of the main valve 15, which constitutes the main damping valve, unseats from the annular valve seat 2D to open. Thus, a predetermined extension damping force can be generated. The outer check valve 18 of the extension damping mechanism 13 opens when the pressure in the pressure chamber D increases to the relief set pressure. Thus, the outer check valve 18 functions as a relief valve suppressing the increase in pressure in the pressure chamber D.

The following is an explanation of the way in which damping force is variably adjusted by varying the passage area of each of the first and second passages with the shutter 33 of the passage area varying mechanism 32.

Figure 8:
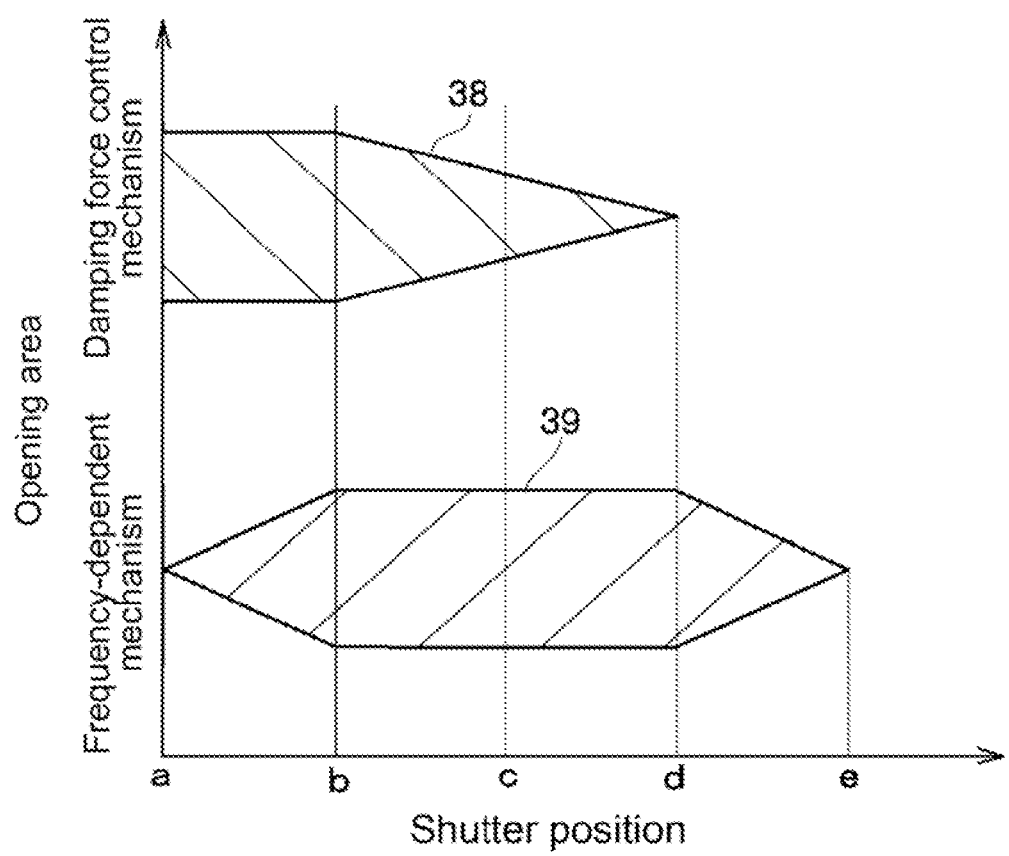
FIG. 8 is a characteristic chart showing the relationship between the shutter position and the opening area in the first embodiment.

In the first embodiment, as shown by the oblique-line area 38 in FIG. 8, when the shutter 33 is set at the position a, the oil grooves 33C and 33D of the shutter 33 face directly opposite to the oil holes 3D and 3E of the piston rod 3, and at this time, the opening area between the mutually opposing oil grooves and holes (i.e. the passage area of the first passage, which is the damping force control mechanism-side passage) reaches the maximum opening area. When the shutter 33 is rotated from the position a to the position b also, the opening area is kept maximum. However, when the shutter 33 is rotated from the position b to the position c and then to the position d, the opening area is gradually reduced by, for example, the oil grooves 33D. At the position d, the opening area is zero. The oil holes 3D and 3E are closed by the outer peripheral surface of the shutter 33 and brought out of communication with each other. When the shutter 33 is rotated from the position d to the position e also, the opening area is kept zero.

On the other hand, the opening area between the oil holes 3C of the piston rod 3 and the orifices 33B (i.e. the passage area of the second passage, which is the frequency-dependent mechanism-side passage) changes as follows. As shown by the oblique-line area 39 in FIG. 8, when the shutter 33 is set at the position a, the opening area is zero. However, when the shutter 33 is rotated from the position a to the position b, the orifices 33B face directly opposite to the oil holes 3C, and the opening area becomes maximum. When the shutter 33 is rotated from the position b to the position d, the opening area is kept maximum. When the shutter 33 is rotated to the position e, the opening area becomes zero.

Thus, in the first embodiment, when the shutter position is changed from a to b, the opening area of the damping force control mechanism-side passage is constant (maximum opening area), whereas the opening area of the frequency-dependent mechanism-side passage is controlled from zero to maximum. When the shutter position is changed from b to d, the damping force control mechanism opening area gradually decreases to zero, whereas the frequency-dependent mechanism opening area is constant (maximum opening area). When the shutter position is changed from d to e, the damping force control mechanism opening area is zero, whereas the frequency-dependent mechanism opening area gradually decreases and becomes zero at the position e.

Figure 9:
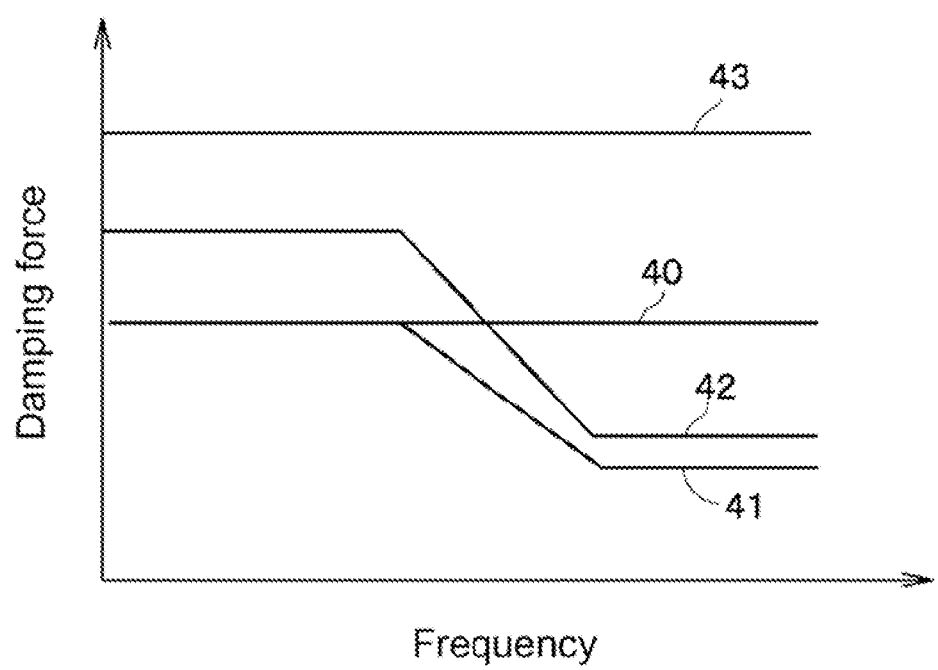
FIG. 9 is a characteristic chart showing the relationship between frequency and damping force in the first embodiment.

In this regard, assuming that the contraction speed (or extension speed) of the piston rod 3 is constant, the characteristics of damping force with respect to the extension-contraction frequency of the piston rod 3 may be represented by the characteristic curves 40 to 43 shown in FIG. 9. That is, when the rotational position of the shutter 33 is at a, the damping force control mechanism opening area is large, whereas the frequency-dependent mechanism opening area is zero. Accordingly, at the position a, damping force characteristics can be set as shown by the characteristic curve 40. That is, the damping force is "soft" and invariable with respect to the frequency.

When the rotational position of the shutter 33 is switched from the position a to the position b, the damping force control mechanism opening area is kept constant, whereas the frequency-dependent mechanism opening area increases to the maximum. Therefore, at the position b, damping force characteristics can be set as shown by the characteristic curve 41. That is, the damping force is "soft" in the low frequency region and even more "soft" in the high frequency region.

When the rotational position of the shutter 33 is switched from the position b to the position d, the damping force control mechanism opening area gradually decreases, whereas the frequency-dependent mechanism opening area is kept constant at the maximum. Therefore, at the position d, damping force characteristics can be set as shown by the characteristic curve 42 shown in FIG. 9. That is, the damping force is "hard" in the low frequency region and "soft" in the high frequency region.

When the rotational position of the shutter 33 is switched from the position d to the position e, the damping force control mechanism opening area is kept zero, whereas the frequency-dependent mechanism opening area gradually decreases to zero. Therefore, at the position e, damping force characteristics can be set as shown by the characteristic curve 43 shown in FIG. 9. That is, the damping force is "hard" in the low frequency region and kept "hard" even in the high frequency region, i.e. invariable with respect to the frequency.

Thus, it is possible according to the first embodiment to adjust the damping force variable width (reduction rate) in the high frequency region at each rotational position of the shutter 33 in addition to damping force in the low frequency region as shown by the characteristic curves 40 to 43 in FIG. 9. Therefore, if the rotational position of the shutter 33 is set to the position b, for example, damping force can be controlled in a comfort mode in which the vehicle ride quality is taken into account, as shown by the characteristic curve 41. That is, during running at low speed, damping force is controlled to be "soft" in the low frequency region and made even more "soft" in the high frequency region by utilizing the frequency-dependent control function.

If the shutter 33 is switched to the position a to set damping force characteristics as shown by the characteristic curve 40, the frequency-dependent control function is off, so that damping force can be kept high even in the vicinity of unsprung resonance frequency. Therefore, it is possible to suppress unsprung vibration after the vehicle has ridden over a bump, for example. During running at high speed, damping force can be controlled in a sport mode in which the steering stability is taken into account. If the shutter 33 is switched to the position d to set damping force characteristics as shown by the characteristic curve 42, it is possible to obtain "hard" damping force for use in ride quality control such as sprung vibration control and further possible to suppress high-frequency vibrations by utilizing the frequency-dependent control function. Accordingly, as compared to shock absorbers without the frequency-dependent control function, the shock absorber of this embodiment can perform ride quality control of a higher order, or perform ride quality control equivalent in level by a simpler control operation. lithe shutter 33 is switched to the position e to set damping force characteristics as shown by the characteristic curve 43, it is possible to obtain "hard" damping force for use in suppression of roll when steering, for example, and further possible to exhibit the steering stability control performance to the maximum because the frequency-dependent control function is off.

Therefore, according to this embodiment, the compression first passage can be formed by the oil holes 3D and 3E of the piston rod 3, the oil grooves 33C and 33D of the shutter 33, the pressure chamber C of the compression damping mechanism 4, the arcuate holes 7B of the main disk 7, the cut holes 11B of the disk valve 11, the oil paths 2B of the piston 2, etc. In addition, the extension first passage can be formed by the oil holes 3F and 3G of the piston rod 3, the oil grooves 33E and 33F of the shutter 33, the pressure chamber D of the extension damping mechanism 13, the arcuate holes 16B of the main disk 16, the cut holes 20B of the disk valve 20, the oil paths 2A of the piston 2, etc. Further, the second passage can be formed by the port member 22, the oil holes 3C of the piston rod 3, the orifices 33B and inner hole 33A of the shutter 33, the housing 26, etc.

The respective areas of the first and second passages, which are formed as stated above, can be adjusted separately from each other by the shutter 33 of the passage area varying mechanism 32. Therefore, no matter to which damping force characteristics, i.e. "hard", "medium" or "soft" characteristics, damping force to be generated by the shock absorber is changed, the damping force variable width of the frequency-dependent mechanism 25, which comprises the free piston 29 and so forth, can be freely changed according to each of the damping force characteristics selected. Accordingly, it is possible to properly realize damping force control that takes account of the vehicle ride quality and damping force control taking the steering stability into account.

In this case, the orifice area of each of the compression and extension damping mechanisms 4 and 13 and the orifice area of the frequency-dependent mechanism 25 that determines a damping force variable width can be adjusted independently of each other according to characteristics inherent in the vehicle concerned and the aim in controlling damping force (i.e. damping force control that takes account of the vehicle ride quality, or damping force control taking the steering stability into account, for example). In addition, damping force can be reduced even in the high frequency region, in which damping force is difficult to control, by the frequency-dependent mechanism 25, and damping force can be reduced only in the high frequency region. Therefore, no complicated control is needed. Accordingly, a spec-down of the control CPU results in a less costly configuration. In addition, because the control frequency is low, this embodiment is also advantageous in terms of durability.

In addition, the O-rings 30 and 31, which constitute resistive elements, are provided between the housing 26 and free piston 29 of the frequency-dependent mechanism 25. The O-rings 30 and 31 can generate resistance to the free piston 29 when axially displaced in the housing 26. Therefore, damping force generated by the frequency-dependent mechanism 25 can be changed smoothly.

In addition, the free piston contact surfaces at which the O-rings 30 and 31 contact the free piston 29 are defined by the sloped arcuate surfaces 29B and 29C formed on the upper and lower sides, respectively, of the annular projection 29A. The housing contact surface at which the O-ring 31 contacts the housing 26 is defined by the sloped arcuate surface 28D formed on the inner peripheral surface of the tubular portion 28A. The sloped arcuate surfaces 28D, 29B and 29C are configured to face each other in the moving direction of the free piston 29. In addition, the sloped arcuate surfaces 28D, 29B and 29C are inclined to the moving direction of the free piston 29 and have curved surfaces, respectively.

Therefore, when the O-ring 31, for example, is elastically deformed between the sloped arcuate surfaces 28D and 29C, it is possible to suppress the O-ring 31 from being deformed rapidly and to allow the O-ring 31 to be deformed smoothly. Moreover, the O-rings 30 and 31 can be deformed smoothly in accordance with the displacement of the free piston 29 by setting the curvature of the sloped arcuate surfaces 28D, 29B and 29C larger than the curvature of the O-rings 30 and 31 before elastic deformation. As a result, damping force can be controlled smoothly.

Figure 10:
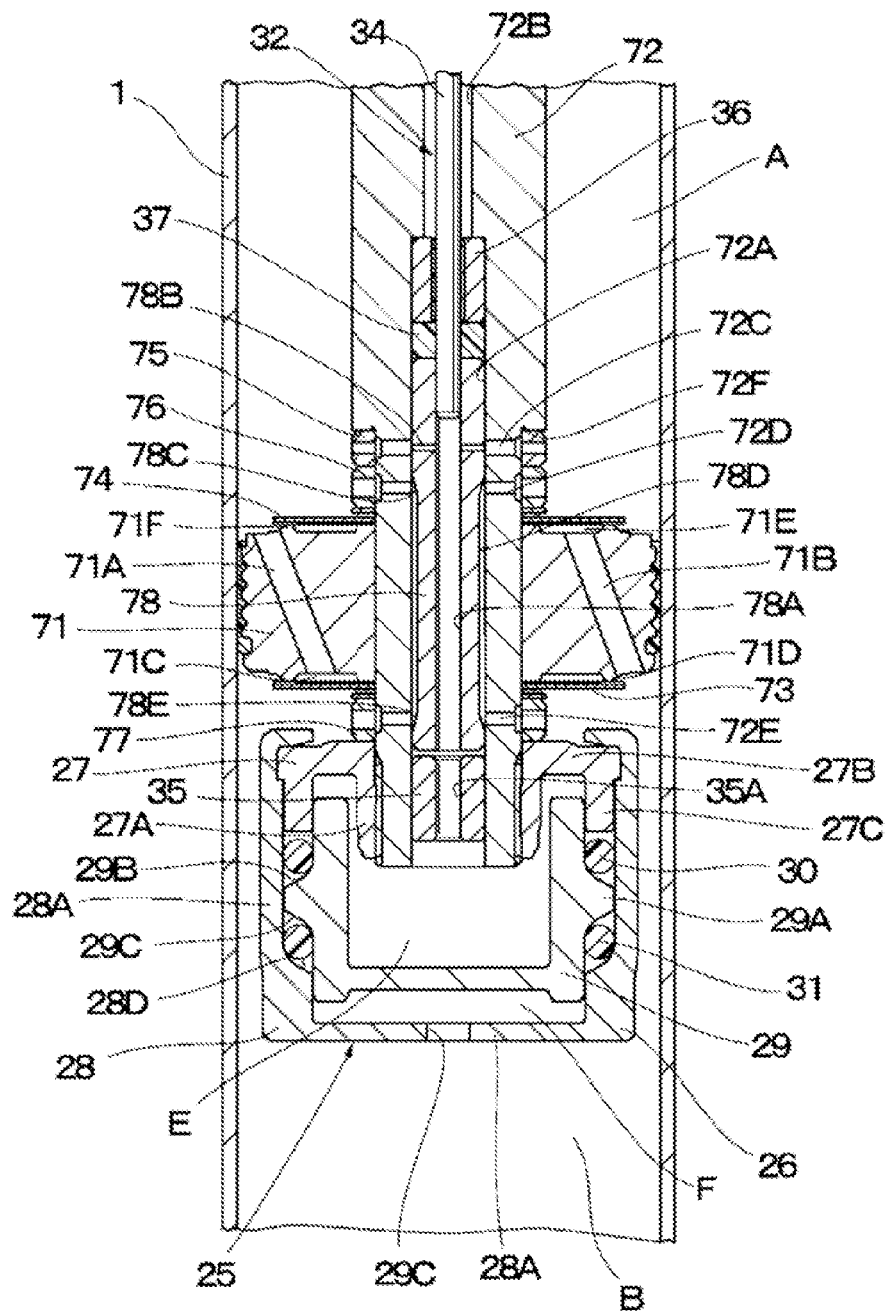
FIG. 10 is a vertical sectional view of a hydraulic shock absorber according to a second embodiment of the present invention.

FIG. 10 shows a second embodiment of the present invention. The feature of the second embodiment resides in that the compression first passage and the extension first passage are formed into a single passage common to the compression and extension strokes. It should be noted that, in the second embodiment, the same constituent elements as those in the foregoing first embodiment are denoted by the same reference numerals as used in the first embodiment, and that a description thereof is omitted.

In FIG. 10, reference numeral 71 denotes a piston used in the second embodiment. The piston 71 has substantially the same structure as that of the piston 2 described in the first embodiment. That is, the piston 71 divides the interior of the inner tube 1 into two chambers, i.e. a rod-side oil chamber A and a bottom-side oil chamber B. The piston 71 has a plurality of circumferentially spaced oil paths 71A and a plurality of circumferentially spaced oil paths 71B, which allow communication between the rod-side oil chamber A and the bottom-side oil chamber B. The oil paths 71A and 71B constitute a main passage through which the hydraulic oil flows between the rod-side oil chamber A and the bottom-side oil chamber B.

The piston 71 has a lower end surface defined as one end thereof. The lower end surface of the piston 71 is provided with an annular recess 71C surrounding the opening at one end of each oil path 71A and further provided with an annular valve seat 71D located radially outside the annular recess 71C. An extension disk valve 73 (described later) selectively seats on and unseats from the annular valve seat 71D. The upper end surface, i.e. the other end, of the piston 71 is provided with an annular recess 71E surrounding the openings at the other ends of the oil paths 71B and further provided with an annular valve seat 71F located radially outside the annular recess 71E. A compression disk valve 74 (described later) selectively seats on and unseats from the annular valve seat 71F.

Reference numeral 72 denotes a piston rod used in the second embodiment. The piston rod 72 has substantially the same structure as that of the piston rod 3 described in the first embodiment. The piston rod 72 has a lower end defined as one end thereof. The lower end of the piston rod 72 is secured to the piston 71 by a capped nut 27 of a housing 26, etc. The piston rod 72 is provided with a shutter fitting hole 72A and a reduced-diameter rod insertion hole 72B extending axially through the inner periphery thereof. The shutter fitting hole 72A opens at the lower end of the piston rod 72 and has a shutter 78 (described later) rotatably fitted therein. The rod insertion hole 72B extends upward from the upper end of the shutter fitting hole 72A.

The piston rod 72 is provided with axially spaced groups of a plurality of circumferentially spaced oil holes 72C, 72D and 72E extending radially outward from the shutter fitting hole 72A. Among the oil holes 72C to 72E, the oil holes 72C and 72D are disposed to open in the rod-side oil chamber A, and the remaining oil holes 72E are disposed to open in the bottom-side oil chamber B in the inner tube 1.

Among the oil holes 72C to 72E, the uppermost oil holes 72C are selectively brought into and out of communication with an inner hole 78A of the shutter 78 (described later) through radial orifices 78B. The oil holes 72D and 72E are selectively brought into and out of communication with each other through oil grooves 78C and 78D of the shutter 78 (described later). Further, the piston rod 72 has an annular stepped portion 72F formed on the outer periphery thereof. A port member 75 (described later) is axially positioned to the stepped portion 72F.

Reference numerals 73 and 74 denote disk valves used in this embodiment as main damping valves, respectively. Of the two disk valves 73 and 74, the disk valve 73 for the extension stroke is provided on the lower end surface of the piston 71, which is one end surface thereof. When the piston 71 is slidingly displaced upward during the extension stroke of the piston rod 72, the extension disk valve 73 offers resistance to the hydraulic oil flowing through the oil paths 71A to generate a predetermined damping force. The disk valve 74 for the compression stroke is provided on the upper end surface of the piston 71, which is the other end surface thereof. When the piston 71 is slidingly displaced downward during the compression stroke of the piston rod 72, the compression disk valve 74 offers resistance to the hydraulic oil flowing through the oil paths 71B to generate a predetermined damping force.

Reference numerals 75 and 76 denote port members provided between the stepped portion 72F of the piston rod 72 and the piston 71. The port members 75 and 76 are annular rings or the like fitted around the outer periphery of the piston rod 72. The port member 75 allows the hydraulic oil to flow in and out between the rod-side oil chamber A and the oil holes 72C of the piston rod 72. The port member 76 allows the hydraulic oil to flow in and out between the rod-side oil chamber A and the oil holes 72D of the piston rod 72.

Reference numeral 77 denotes another port member provided between the piston 71 and the capped nut 27. The port member 77 is also an annular ring or the like fitted around the outer periphery of the piston rod 72. The port member 77 allows the hydraulic oil to flow in and out between the bottom-side oil chamber B and the oil holes 72E of the piston rod 72.

Reference numeral 78 denotes a shutter used in this embodiment. The shutter 78 constitutes an opening area varying member of the passage area varying mechanism 32 substantially in the same way as the shutter 3 described in the first embodiment. That is, the shutter 78 has an axially extending inner hole 78A, orifices 78B provided as openings extending radially outward from the inner hole 78A, and oil grooves 78C, 78D and 78E formed on the outer peripheral surface of the shutter 78, being spaced from the orifices 78B in the axial direction of the shutter 78. The oil grooves 78C, 78D and 78E constitute a damping force generating mechanism, together with the oil holes 72D and 72E of the piston rod 72.

The oil grooves 78C, 78D and 78E of the shutter 78 are formed from mutually communicated grooves to selectively bring the oil holes 72D and 72E of the piston rod 72 into and out of communication with each other according to the rotational position of the shutter 78. The oil grooves 78C and 78E have a configuration similar to that of the oil grooves 33D (see FIG. 7) described in the first embodiment. The oil grooves 78D have a configuration similar to that of the oil grooves 33C (see FIG. 6) descried in the first embodiment. The oil grooves 78C to 78E of the shutter 78 constitute a first passage, which is a constituent feature of the present invention, together with the oil holes 72D and 72E of the piston rod 72, the port members 76 and 77, etc. The first passage is parallel to the above-described main passage.

The orifices 78B are disposed at respective positions where the orifices 78B can radially face the oil holes 72C of the piston rod 72. The orifices 78B selectively bring the oil holes 72C into and out of communication with the inner hole 78A according to the rotational position oldie shutter 78. The second passage, which is a constituent feature of the present invention, comprises the port member 75, which communicates with the rod-side oil chamber A, the oil holes 72C of the piston rod 72, the orifices 78B and inner hole 78A of the shutter 78, and the housing 26. The second passage is parallel to the main passage.

Thus, the second embodiment arranged as stated above also provides substantially the same advantageous effects as those of the foregoing first embodiment. In the second embodiment, in particular, the first passage, which comprises the oil holes 72D and 72E of the piston rod 72, the oil grooves 78C to 78E of the shutter 78, etc., can be formed as a single passage common to the extension and compression strokes. Accordingly, the overall structure can be simplified. In addition, substantially the same advantageous effects as those described in the first embodiment and the first and second modifications can be implemented at a further reduced cost.

Figure 11:
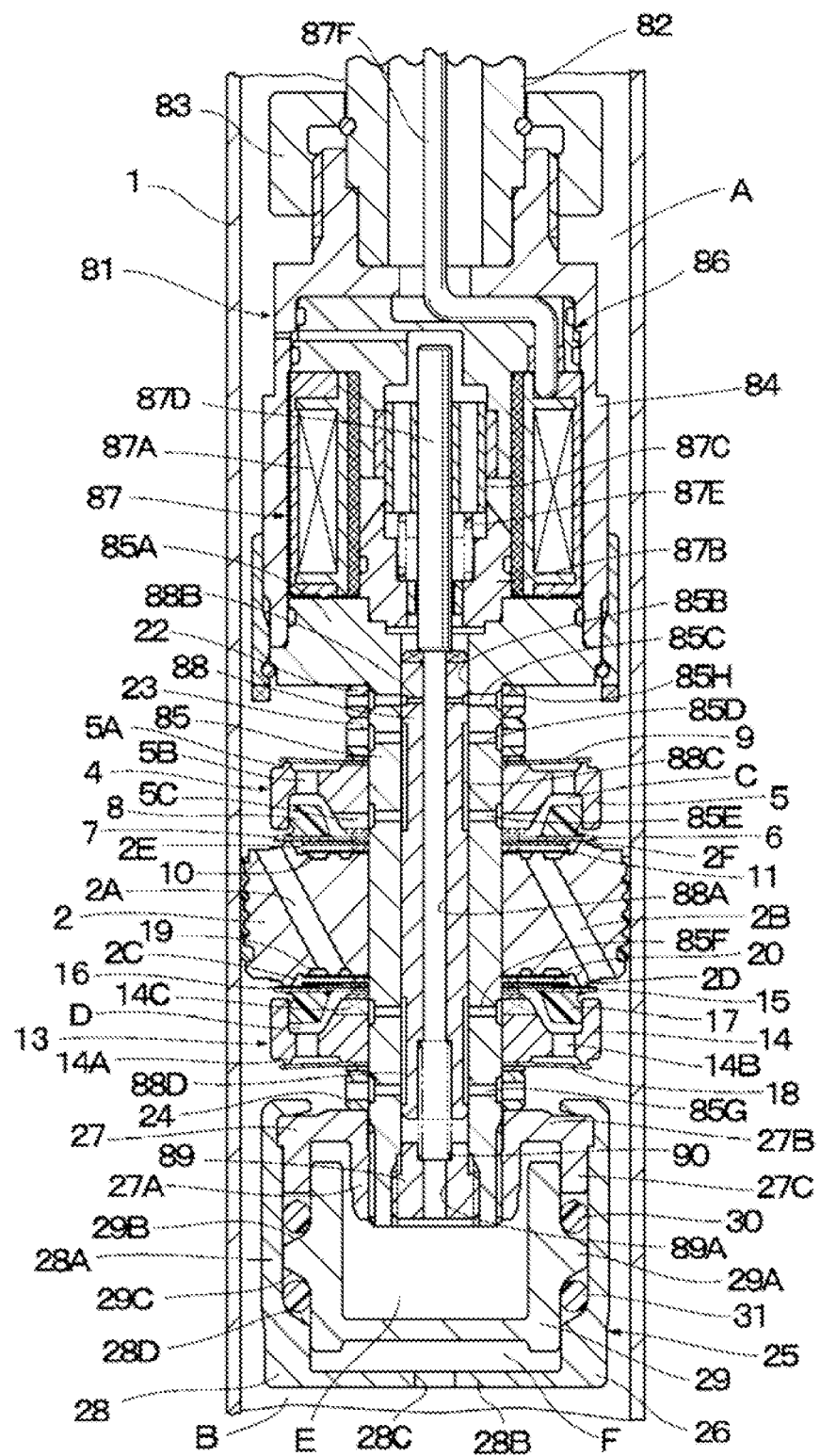
FIG. 11 is a vertical sectional view of a hydraulic shock absorber according to a third embodiment of the present invention.

FIG. 11 shows a third embodiment of the present invention. The feature of the third embodiment resides in that the actuator of the passage area varying mechanism comprises an electromagnetic proportional solenoid, and that a passage area varying member is displaced in the axial direction of the piston rod. It should be noted that, in the third embodiment, the same constituent elements as those in the foregoing first embodiment are denoted by the same reference numerals as those used in the first embodiment, and a description thereof is omitted.

In FIG. 11, reference numeral 81 denotes a piston rod used in the third embodiment. The piston rod 81 includes, as shown in FIG. 11, a tubular rod 82 extending axially in the inner tube 1, a tubular casing 84 connected to one (lower) end of the tubular rod 82 through a connecting member 83 and accommodating therein a proportional solenoid 87 (described later), and a stepped rod 85 detachably secured to the lower end of the tubular casing 84. The other (upper) end of the tubular rod 82 projects out of the inner tube 1 to form a projecting end.

The stepped rod 85 has substantially the same structure as that of the lower portion of the piston rod 3 described in the first embodiment and is secured to the piston 2 by the capped nut 27 of the housing 26, etc. The upper end of the stepped rod 85 forms an enlarged-diameter mounting boss 85A fitted to the lower end of the tubular casing 84. The stepped rod 85 is arranged substantially in the same way as the lower portion of the piston rod 3 (see FIG. 1) in the first embodiment, except the mounting boss 85A.

That is, the inner periphery of the stepped rod 85 forms an axially extending spool sliding hole 85B opening at the lower end of the stepped rod 85. The spool sliding hole 85B is slidably fitted with a spool 88 (described later). The stepped rod 85 is provided with axially spaced groups of a plurality of circumferentially spaced oil holes 85C, 85D, 85E, 85F and 85G extending radially outward from the spool sliding hole 85B. Among the oil holes 85C to 85G, the oil holes 85C to 85E are disposed in the rod-side oil chamber A defined in the inner tube 1 by the piston 2, and the remaining oil holes 85F and 85G are disposed in the bottom-side oil chamber B in the inner tube 1.

Among the oil holes 85C to 85G, the uppermost oil holes 85C are selectively brought into and out of communication with an inner hole 88A of the spool 88 (described later) through radial orifices 88B. The oil holes 85D and 85E are selectively brought into and out of communication with each other through oil grooves 88C of the spool 88 (described later). The oil holes 85F and 85G are selectively brought into and out of communication with each other through oil grooves 88D of the spool 88 (described later). In addition, the stepped rod 85 has an annular stepped portion 85H formed on the mounting boss 85A. The port member 22 is axially positioned to the stepped portion 85H.

Reference numeral 86 denotes a passage area varying mechanism used in this embodiment. Reference numeral 87 denotes an electromagnetic proportional solenoid (hereinafter referred to as "proportional solenoid 87") constituting an actuator of the passage area varying mechanism 86. The proportional solenoid 87 includes a tubular coil part 87A accommodated in the tubular casing 84 of the piston rod 81, a fixed holder 87B fixedly provided at the inner periphery of the coil part 87A, a movable core 87C displaceably provided at the inner periphery of the coil part 87A in axially opposed relation to the fixed holder 87B, an output rod 87D fixedly provided in the center of the movable core 87C, and a spring 87E disposed between the fixed holder 87B and the movable core 87C to urge the output rod 87D, together with the movable core 87C, axially upward.

The proportional solenoid 87 operates as follows. When an electric current is externally supplied to the coil part 87A through a lead wire 87F and so forth, the movable core 87C and the output rod 87D are axially displaced together against the spring 87E. At this time, the amount of axial displacement of the output rod 87D is controlled in proportion to the value of electric current flowing through the coil part 87A. Thus, a spool 88 (described later) is slidingly displaced axially in the spool sliding hole 85B of the stepped rod 85, as shown in FIG. 8, which illustrates the first embodiment.

Reference numeral 88 denotes a spool used in this embodiment as an opening area varying member. The spool 88 is slidably provided in the spool sliding hole 85B of the piston rod 81 (stepped rod 85) in place of the shutter 33, which has been described in the first embodiment. The spool 88 is axially rectilinearly moved in the spool sliding hole 85B by the output rod 87D of the proportional solenoid 87. The spool 88 is provided with an axially extending inner hole 88A, orifices 88B bored in the spool 88 radially outward from the inner hole 88A to serve as openings, and annular oil grooves 88C and 88D formed on the outer peripheral surface of the spool 88. The oil grooves 88C and 88D are spaced from the orifices 88B in the axial direction of the spool 88.

The orifices 88B are, as shown in FIG. 11, disposed at respective positions where the orifices 88B can radially face the oil holes 85C of the stepped rod 85. The orifices 88B selectively bring the oil holes 85C into and out of communication with the inner hole 88A according to the sliding displacement of the spool 88. The orifices 88B and inner hole 88A of the spool 88 constitute a second passage, which is a constituent feature of the present invention, together with the port member 22, which communicates with the rod-side oil chamber A, the oil holes 85C of the stepped rod 85, the housing 26, etc.

The oil grooves 88C of the spool 88 selectively bring the oil holes 85D and 85E of the stepped rod 85 into and out of communication with each other according to the sliding displacement of the spool 88. The oil grooves 88C constitute a compression first passage, which is a constituent feature of the present invention, together with the oil holes 85D and 85E of the stepped rod 85, the pressure chamber C of the compression damping mechanism 4, the arcuate holes 7B of the main disk 7, the cut holes 11B (see FIGS. 2 to 4) of the disk valve 11, the oil paths 2B of the piston 2, etc.

The oil grooves 88D of the spool 88 selectively bring the oil holes 85F and 85G of the stepped rod 85 into and out of communication with each other according to the sliding displacement of the spool 88. The oil grooves 88D constitute an extension first passage, which is a constituent feature of the present invention, together with the oil holes 85F and 85G of the stepped rod 85, the pressure chamber D of the extension damping mechanism 13, the arcuate holes 16B of the main disk 16, the cut holes 20B of the disk valve 20, the oil paths 2A of the piston 2, etc.

The spool sliding hole 85B of the stepped rod 85 is provided therein with a tubular member 89 at the lower (one axial) end of the spool 88. The inner periphery of the tubular member 89 defines an inner hole 89A constituting a part of the above-described second passage. A return spring 90 is provided between the lower end of the spool 88 and the tubular member 89. The return spring 90 constantly urges the spool 88 toward the output rod 87D of the proportional solenoid 87.

Thus, the third embodiment arranged as stated above also provides substantially the same advantageous effects as those of the foregoing first embodiment. That is, the first passage (the opening area of the damping force control mechanism) and the second passage (the opening area of the frequency-dependent mechanism) can be adjusted individually from each other as shown by the oblique-line areas 38 and 39 in FIG. 8 of the first embodiment by slidingly displacing (rectilinearly moving) the spool 88 with the output rod 87D of the proportional solenoid 87.

According to the third embodiment, in particular, the proportional solenoid 87 is used as an actuator of the passage area varying mechanism 86. Therefore, the adjustment of damping force can be continuously performed, and hence the damping force can be adjusted with a higher accuracy. Accordingly, a high control effect can be obtained. Further, because the proportional solenoid 87 as an actuator is built in the inner tube 1 (i.e. in the tubular casing 84 of the piston rod 81), it is possible to improve the installability of the shock absorber to the vehicle. That is, the shock absorber can be installed without the actuator projecting into the engine room. Thus, it is possible to realize space-saving and safe installation of the shock absorber.

It should be noted that, in the foregoing first and third embodiments, the compression first passage and the extension first passage have the same configuration, by way of example. The present invention, however, is not limited to the described structure. For example, the compression oil grooves 33C and 33D (oil grooves 88C) and the extension oil grooves 33E and 33F (oil grooves 88D) may be made different in configuration from each other to obtain different damping force characteristics for the compression and extension strokes. For example, when "hard" damping force characteristics are set for the extension stroke, "soft" damping force characteristics are set for the compression stroke, or when "soft" damping force characteristics are set for the extension stroke, "hard" damping force characteristics are set for the compression stroke.

In the foregoing first embodiment, the present invention has been described by way of an example in which the respective passage areas of the first and second passages are variably adjusted by using a single shutter 33. The present invention, however, is not limited thereto. For example, the respective passage areas of the first and second passages may be adjusted individually from each other by using respective shutters. The shutters may be rotated by respective actuators. The shutter of the passage area varying mechanism may be rotated by hand but not with an actuator. The same goes for the second and third embodiments.

In the foregoing first embodiment, the O-rings 30 and 31 are provided as resistive elements between the housing 26 and the free piston 29, by way of example. The present invention, however, is not limited thereto. For example, a spring such as a coil spring, a leaf spring, etc. may be used as a resistive element as in shock absorbers disclosed in Japanese Patent Application Publication No. Hei 06-94065 (mentioned above) and Japanese Utility Model Application Publication No. Hei 07-19642. An elastic member used as a resistive element is not limited to an O-ring but may be an elastic ring having a quadrangular or non-circular cross-sectional configuration. The same goes for the second and third embodiments.

In the foregoing embodiments, the present invention has been explained by taking a hydraulic shock absorber as an example of a shock absorber provided in a vehicle such as an automobile. However, the present invention is not limited to the above but may also be applied, for example, to damping force control type shock absorbers for use in various machines, architectural structures, etc. which constitute vibration sources.

As has been stated in the foregoing embodiments, damping force can be reduced by the effect of the frequency-dependent mechanism even in the high frequency region, in which damping force is difficult to control. Therefore, no complicated control is needed. Accordingly, a spec-down of the control CPU results in a less costly configuration. Because the control frequency is low, the present invention is also advantageous in terms of durability. Further, the actuator can be provided inside the cylinder, and it is therefore unnecessary to install the actuator in the trunk room. Thus, the present invention is advantageous in terms of vehicle installability and safety.

According to the present invention, the free piston is movably provided in the housing in which a flow path constituting at least a part of the second passage is formed, and a resistive element is disposed between the housing and the free piston to generate resistance against the displacement of the free piston. With this arrangement, resistance can be generated when the free piston is axially displaced in the housing. Accordingly, damping force generated by the frequency-dependent mechanism can be changed smoothly.

According to the present invention, the resistive element is a spring. In this case, resistance can be generated against the displacement of the free piston by a spring (resistive element), e.g. a leaf spring, as in the shock absorber disclosed in the above-mentioned Japanese Patent Application Publication No. Hei 06-94065.

According to the present invention, at least one elastic member is provided between the free piston and the housing. The free piston has a free piston contact surface at which the elastic member contacts the free piston. The housing has a housing contact surface at which the elastic member contacts the housing. At least either one of the free piston contact surface and the housing contact surface has a sloped surface inclined to the moving direction of the free piston. The sloped surface is a curved surface. Thus, when the elastic member (e.g. O-ring) is elastically deformed by the sloped curved surface, it is possible to suppress the elastic member from being deformed rapidly and to allow the deformation to take place smoothly. As a result, damping force generated by the frequency-dependent mechanism can be changed smoothly.

According to the present invention, a plurality of elastic members are provided between the free piston and the housing. The free piston has free piston contact surfaces at which the elastic members contact the free piston. The housing has housing contact surfaces at which the elastic members contact the housing. The free piston contact surfaces and the housing contact surfaces have respective portions facing each other in the moving direction of the free piston. Thus, when the elastic members (e.g. O-rings) are elastically deformed between the contact surfaces, it is possible to suppress the elastic members from being deformed rapidly and to allow the deformation to take place smoothly.

In addition, according to the present invention, the elastic members include one elastic member compressively deformed when the free piston moves in one direction and another elastic member compressively deformed when the free piston moves in the other direction. With this arrangement, damping force generated by the frequency-dependent mechanism can be changed smoothly.

In addition, according to the present invention, the damping force generating mechanism has an extension damping force generating mechanism and a compression damping force generating mechanism. The first passage has an extension first passage running through the extension damping force generating mechanism and a compression first passage running through the compression damping force generating mechanism. The passage area varying mechanism is capable of adjusting the respective passage areas of the extension first passage and the compression first passage. With this arrangement, the passage area varying mechanism can adjust the passage area of the extension first passage and also can adjust the passage area of the compression first passage.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority under 35 U.S.C. section 119 to Japanese Patent Applications No. 2010-292258, filed on Dec. 28, 2010, and Japanese Patent Application No. 2011-240307, filed on Nov. 1, 2011. The entire disclosure of Japanese Patent Applications No. 2010-292258, filed on Dec. 28, 2010 and No. 2011-240307 filed on Nov. 1, 2011 including specification, claims, drawings and summary is incorporated herein by reference in its entirety.

What is claimed is:

1. A shock absorber comprising:
a cylinder having a hydraulic fluid sealed therein;
a piston movably fitted in the cylinder to define two chambers in the cylinder;
a piston rod secured at one end thereof to the piston, the other end of the piston rod projecting out of the cylinder;
a main passage through which the hydraulic fluid flows between the two chambers in the cylinder in response to movement of the piston;
a first passage and a second passage, which are provided in parallel to the main passage, and through which the hydraulic fluid flows from either one of the two chambers in the cylinder toward the other of the two chambers in response to movement of the piston;
a main damping valve provided in the main passage to regulate a flow of the hydraulic fluid induced by movement of the piston to generate a damping force;
a damping force generating mechanism provided in the first passage to regulate a flow of the hydraulic fluid induced by movement of the piston to generate a damping force;
a free piston provided in the second passage to divide the second passage into an upstream section and a downstream section; and
a passage area varying mechanism provided halfway in the first passage and the second passage,
the passage area varying mechanism being capable of adjusting respective passage areas of the first passage and the second passage, and the passage area varying mechanism being operable with a single control rod.

2. The shock absorber of claim 1, wherein the free piston is movably provided in a housing in which a flow path constituting at least a part of the second passage is formed;
the shock absorber further comprising:
a resistive element disposed between the housing and the free piston to generate resistance against displacement of the free piston.

3. The shock absorber of claim 2, wherein the resistive element is a spring.

4. The shock absorber of claim 3, wherein a plurality of elastic members are provided between the free piston and the housing;
the free piston having free piston contact surfaces at which the elastic members contact the free piston:
the housing having housing contact surfaces at which the elastic members contact the housing;
the free piston contact surfaces and the housing contact surfaces having respective portions facing each other in moving direction of the free piston.

5. The shock absorber of claim 4, wherein the elastic members include one elastic member compressively deformed when the free piston moves in one direction and another elastic member compressively deformed when the free piston moves in the other direction.

6. The shock absorber of claim 3, wherein at least one elastic member is provided between the free piston and the housing;
the free piston having a free piston contact surface at which the at least one elastic member contacts the free piston;
the housing having a housing contact surface at which the at least one elastic member contacts the housing;
at least either one of the free piston contact surface and the housing contact surface having a sloped surface inclined to moving direction of the free piston;
the sloped surface being a curved surface.

7. The shock absorber of claim 1, wherein the passage area varying mechanism has, in a variable region where the passage area of the first passage decreases, an invariable region where the passage area of the second passage is invariable.

8. The shock absorber of claim 1, wherein the second passage is formed in the piston rod:
   the passage area varying mechanism comprising:
   an opening area varying member provided with an opening disposed in the piston rod; and
   an actuator causing one of rotation and rectilinear motion of the opening area varying member.

9. The shock absorber of claim 1, wherein the damping force generating mechanism has an extension damping force generating mechanism and a compression damping force generating mechanism;
   the first passage having:
   an extension first passage running through the extension damping force generating mechanism; and
   a compression first passage running through the compression damping force generating mechanism;
   the passage area varying mechanism being capable of adjusting respective passage areas of the extension first passage and the compression first passage.

* * * * *